US009230437B2

(12) United States Patent
Brinton et al.

(10) Patent No.: US 9,230,437 B2
(45) Date of Patent: Jan. 5, 2016

(54) METHOD AND APPARATUS TO ENCODE FUEL USE DATA WITH GPS DATA AND TO ANALYZE SUCH DATA

(75) Inventors: Brett Brinton, Seattle, WA (US); Charles Michael McQuade, Issaquah, WA (US); Roger Andre, Seattle, WA (US); Joshua Hansen, Bellevue, WA (US)

(73) Assignee: ZONAR SYSTEMS, INC., Seattle, WA (US)

( * ) Notice: Subject to any disclaimer, the term of this patent is extended or adjusted under 35 U.S.C. 154(b) by 1347 days.

(21) Appl. No.: 12/836,487

(22) Filed: Jul. 14, 2010

(65) Prior Publication Data
US 2010/0280734 A1 Nov. 4, 2010

Related U.S. Application Data

(63) Continuation-in-part of application No. 12/724,232, filed on Mar. 15, 2010, which is a continuation-in-part of application No. 11/675,502, filed on Feb. 15, 2007, now Pat. No. 7,680,595, which is a continuation-in-part of application No. 11/425,222, filed on Jun. 20, 2006, now Pat. No. 7,564,375.

(51) Int. Cl.
*G07C 5/08* (2006.01)
*G08G 1/0968* (2006.01)
(Continued)

(52) U.S. Cl.
CPC ...... *G08G 1/096805* (2013.01); *B60R 16/0236* (2013.01); *G07C 5/008* (2013.01); *G07C 5/0808* (2013.01); *G08G 1/096844* (2013.01); *G08G 1/20* (2013.01)

(58) Field of Classification Search
CPC .... G07C 5/008; G07C 5/0808; G07C 5/0816; G07C 5/0841; G08G 1/20; B60R 16/0236
USPC ......... 701/32.4, 33.4, 101, 102, 123
See application file for complete search history.

(56) References Cited

U.S. PATENT DOCUMENTS

| 3,573,620 A | 4/1971 | Ashley et al. |
| 3,990,067 A | 11/1976 | Van Dusen et al. ........... 340/306 |

(Continued)

FOREIGN PATENT DOCUMENTS

| CA | 2138378 | 11/1994 | ............... G07C 1/20 |
| CA | 2388572 | 5/2001 | .............. G06F 17/60 |

(Continued)

OTHER PUBLICATIONS

Leavitt, Wendy., "The Convergence Zone." FleetOwner, 4pp. <www.driversmag.com/ar/fleet_convergence_zone/index.html> 1998.

(Continued)

*Primary Examiner* — Erick Solis

(57) ABSTRACT

System and method for analyzing position data and fuel injector data from a vehicle equipped with a geographical position system (GPS) and fuel injector sensors to enable fuel use patterns of the vehicle to be analyzed. Data defining a flow of fuel through the vehicle's fuel injectors is combined with temporal data and GPS data to produce fuel use encoded GPS data that is transmitted to a remote computer. The fuel use encoded GPS data can be analyzed to determine how much fuel was used by the vehicle during off road use to enable proper fuel tax computations to be performed. The data can also be used to evaluate the mechanical condition of a vehicle. By monitoring fuel use for a trip repeated numerous times, a decrease in fuel efficiency may indicate a mechanical problem (dirty injectors, fouled spark plugs, etc).

14 Claims, 3 Drawing Sheets

(51) Int. Cl.
  *G07C 5/00* (2006.01)
  *B60R 16/023* (2006.01)
  *G08G 1/00* (2006.01)

(56) References Cited

U.S. PATENT DOCUMENTS

| | | | | |
|---|---|---|---|---|
| 4,025,791 | A | 5/1977 | Lennington et al. | 250/341 |
| 4,092,718 | A | 5/1978 | Wendt | 364/436 |
| 4,258,421 | A | 3/1981 | Juhasz et al. | 364/424 |
| 4,263,945 | A | 4/1981 | Van Ness | 141/98 |
| 4,325,057 | A | 4/1982 | Bishop | 340/539 |
| 4,469,149 | A | 9/1984 | Walkey et al. | 141/94 |
| 4,602,127 | A | 7/1986 | Neely et al. | 379/68 |
| 4,658,371 | A | 4/1987 | Walsh et al. | 364/550 |
| 4,763,356 | A | 8/1988 | Day, Jr. et al. | 379/368 |
| 4,799,162 | A | 1/1989 | Shinkawa et al. | 364/436 |
| 4,804,937 | A | 2/1989 | Barbiaux et al. | 340/52 F |
| 4,846,233 | A | 7/1989 | Fockens | 141/94 |
| 4,897,792 | A | 1/1990 | Hosoi | 364/449 |
| 4,934,419 | A | 6/1990 | Lamont et al. | 141/94 |
| 4,935,195 | A | 6/1990 | Palusamy et al. | 376/249 |
| 5,058,044 | A | 10/1991 | Stewart et al. | 364/551.01 |
| 5,068,656 | A | 11/1991 | Sutherland | 340/989 |
| 5,072,380 | A | 12/1991 | Randelman et al. | 364/406 |
| 5,120,942 | A | 6/1992 | Holland | 235/376 |
| 5,128,651 | A | 7/1992 | Heckart | 340/433 |
| 5,204,819 | A | 4/1993 | Ryan | 364/465 |
| 5,206,643 | A | 4/1993 | Eckelt | 340/932.2 |
| 5,223,844 | A | 6/1993 | Mansell et al. | 342/357.07 |
| 5,243,323 | A | 9/1993 | Rogers | 340/433 |
| 5,321,629 | A | 6/1994 | Shirata et al. | 702/187 |
| 5,337,003 | A | 8/1994 | Carmichael et al. | 324/402 |
| 5,359,522 | A | 10/1994 | Ryan | 364/465 |
| 5,359,528 | A * | 10/1994 | Haendel et al. | 701/32.4 |
| 5,394,136 | A | 2/1995 | Lammers et al. | 340/439 |
| 5,399,844 | A | 3/1995 | Holland | 235/376 |
| 5,442,553 | A | 8/1995 | Parrillo | 364/424.04 |
| 5,459,304 | A | 10/1995 | Eisenmann | 235/380 |
| 5,459,660 | A | 10/1995 | Berra | 701/33 |
| 5,479,479 | A | 12/1995 | Braitberg et al. | 379/58 |
| 5,488,352 | A | 1/1996 | Jasper | 340/431 |
| 5,499,182 | A | 3/1996 | Ousborne | 364/424.04 |
| 5,541,845 | A | 7/1996 | Klein | 364/449 |
| 5,546,305 | A | 8/1996 | Kondo | 364/424.03 |
| 5,557,254 | A | 9/1996 | Johnson et al. | 340/426 |
| 5,557,268 | A | 9/1996 | Hughes et al. | 340/933 |
| 5,572,192 | A | 11/1996 | Berube | 340/574 |
| 5,585,552 | A | 12/1996 | Heuston et al. | 73/116 |
| 5,594,650 | A | 1/1997 | Shah et al. | 364/449.1 |
| 5,596,501 | A | 1/1997 | Comer et al. | 364/464.23 |
| 5,600,323 | A | 2/1997 | Boschini | 341/176 |
| 5,610,596 | A | 3/1997 | Petitclerc | 340/825.23 |
| 5,623,258 | A | 4/1997 | Dorfman | 340/825.08 |
| 5,629,678 | A | 5/1997 | Gargano et al. | 340/573.4 |
| 5,671,158 | A | 9/1997 | Fournier et al. | 345/8 |
| 5,680,328 | A | 10/1997 | Skorupski et al. | 364/550 |
| 5,719,771 | A | 2/1998 | Buck et al. | 364/443 |
| 5,731,893 | A | 3/1998 | Dominique | 359/379 |
| 5,732,074 | A | 3/1998 | Spaur et al. | 370/313 |
| 5,742,915 | A | 4/1998 | Stafford | 701/35 |
| 5,745,049 | A | 4/1998 | Akiyama et al. | 340/870.17 |
| 5,758,299 | A | 5/1998 | Sandborg et al. | 701/29 |
| 5,758,300 | A | 5/1998 | Abe | 701/33 |
| 5,781,871 | A | 7/1998 | Mezger et al. | 701/33 |
| 5,794,164 | A | 8/1998 | Beckert et al. | 701/1 |
| 5,808,565 | A | 9/1998 | Matta et al. | 340/994 |
| 5,809,437 | A | 9/1998 | Breed | 701/29 |
| 5,815,071 | A | 9/1998 | Doyle | 340/439 |
| 5,835,871 | A | 11/1998 | Smith et al. | 701/29 |
| 5,838,251 | A | 11/1998 | Brinkmeyer et al. | 340/825.31 |
| 5,839,112 | A | 11/1998 | Schreitmueller et al. | 705/4 |
| 5,867,404 | A | 2/1999 | Bryan | 364/550 |
| 5,874,891 | A | 2/1999 | Lowe | 340/433 |
| 5,884,202 | A | 3/1999 | Arjomand | 701/29 |
| 5,890,061 | A | 3/1999 | Timm et al. | 455/404 |
| 5,890,520 | A | 4/1999 | Johnson, Jr. | 141/94 |
| 5,913,180 | A | 6/1999 | Ryan | 702/45 |
| 5,922,037 | A | 7/1999 | Potts | 701/29 |
| 5,923,572 | A | 7/1999 | Pollock | 364/528.17 |
| 5,928,291 | A * | 7/1999 | Jenkins et al. | 701/1 |
| 5,942,753 | A | 8/1999 | Dell | 250/338.1 |
| 5,956,259 | A | 9/1999 | Hartsell, Jr. et al. | 364/528.37 |
| 5,995,898 | A | 11/1999 | Tuttle | 701/102 |
| 6,009,355 | A | 12/1999 | Obradovich et al. | 701/1 |
| 6,009,363 | A | 12/1999 | Beckert et al. | 701/33 |
| 6,016,457 | A * | 1/2000 | Toukura et al. | 701/70 |
| 6,016,795 | A | 1/2000 | Ohki | 123/681 |
| 6,024,142 | A | 2/2000 | Bates | 141/94 |
| 6,025,776 | A | 2/2000 | Matsuura | 340/438 |
| 6,043,661 | A | 3/2000 | Gutierrez | 324/504 |
| 6,054,950 | A | 4/2000 | Fontana | 342/463 |
| 6,061,614 | A | 5/2000 | Carrender et al. | 701/33 |
| 6,064,299 | A | 5/2000 | Lesesky et al. | 340/431 |
| 6,070,156 | A | 5/2000 | Hartsell, Jr. | 705/413 |
| 6,078,255 | A | 6/2000 | Dividock et al. | 340/539 |
| 6,084,870 | A | 7/2000 | Wooten et al. | 370/349 |
| 6,092,021 | A | 7/2000 | Ehlbeck et al. | 701/123 |
| 6,107,915 | A | 8/2000 | Reavell et al. | 340/433 |
| 6,107,917 | A | 8/2000 | Carrender et al. | 340/505 |
| 6,112,152 | A | 8/2000 | Tuttle | 701/115 |
| 6,127,947 | A | 10/2000 | Uchida et al. | 340/999 |
| 6,128,551 | A | 10/2000 | Davis et al. | 700/236 |
| 6,128,959 | A | 10/2000 | McGovern et al. | 73/660 |
| 6,169,938 | B1 | 1/2001 | Hartsell, Jr. | 700/302 |
| 6,169,943 | B1 | 1/2001 | Simon et al. | 701/29 |
| 6,199,099 | B1 | 3/2001 | Gershman et al. | 709/203 |
| 6,202,008 | B1 | 3/2001 | Beckert et al. | 701/33 |
| 6,208,948 | B1 | 3/2001 | Klingler et al. | 702/183 |
| 6,236,911 | B1 | 5/2001 | Kruger | 701/1 |
| 6,240,365 | B1 | 5/2001 | Bunn | 701/213 |
| 6,253,129 | B1 | 6/2001 | Jenkins et al. | 701/29 |
| 6,256,579 | B1 | 7/2001 | Tanimoto | 701/201 |
| 6,259,358 | B1 | 7/2001 | Fjordbotten | 340/433 |
| 6,263,273 | B1 | 7/2001 | Henneken et al. | 701/51 |
| 6,263,276 | B1 | 7/2001 | Yokoyama et al. | 701/207 |
| 6,278,936 | B1 | 8/2001 | Jones | 701/201 |
| 6,285,953 | B1 | 9/2001 | Harrison et al. | 701/213 |
| 6,295,492 | B1 | 9/2001 | Lang et al. | 701/33 |
| 6,330,499 | B1 | 12/2001 | Chou et al. | 701/33 |
| 6,339,745 | B1 | 1/2002 | Novik | 701/208 |
| 6,362,730 | B2 | 3/2002 | Razavi et al. | 340/438 |
| 6,370,454 | B1 | 4/2002 | Moore | 701/29 |
| 6,374,176 | B1 | 4/2002 | Schmier et al. | 701/200 |
| 6,396,413 | B2 | 5/2002 | Hines et al. | 340/825.49 |
| 6,411,203 | B1 | 6/2002 | Lesesky et al. | 340/431 |
| 6,411,891 | B1 | 6/2002 | Jones | 701/201 |
| 6,417,760 | B1 | 7/2002 | Mabuchi et al. | 340/5.3 |
| 6,438,472 | B1 | 8/2002 | Tano et al. | 701/35 |
| 6,450,411 | B1 | 9/2002 | Rash et al. | 236/44 A |
| 6,456,039 | B1 | 9/2002 | Lauper et al. | 320/107 |
| 6,502,030 | B2 | 12/2002 | Hilleary | 701/207 |
| 6,505,106 | B1 | 1/2003 | Lawrence et al. | 701/35 |
| 6,507,810 | B2 | 1/2003 | Razavi et al. | 703/24 |
| 6,529,723 | B1 | 3/2003 | Bentley | 455/405 |
| 6,529,808 | B1 | 3/2003 | Diem | 701/29 |
| 6,539,296 | B2 | 3/2003 | Diaz et al. | 701/33 |
| 6,571,168 | B1 * | 5/2003 | Murphy et al. | 701/123 |
| 6,587,768 | B2 | 7/2003 | Chene et al. | 701/33 |
| 6,594,579 | B1 | 7/2003 | Lowrey et al. | 701/123 |
| 6,594,621 | B1 | 7/2003 | Meeker | 702/185 |
| 6,597,973 | B1 | 7/2003 | Barich et al. | 701/29 |
| 6,604,033 | B1 | 8/2003 | Banet et al. | 701/33 |
| 6,608,554 | B2 | 8/2003 | Leseskey et al. | 340/431 |
| 6,609,082 | B2 | 8/2003 | Wagner | 702/182 |
| 6,611,740 | B2 | 8/2003 | Lowrey et al. | 701/29 |
| 6,614,392 | B2 | 9/2003 | Howard | 342/357.07 |
| 6,616,036 | B2 | 9/2003 | Streicher et al. | 235/381 |
| 6,621,452 | B2 | 9/2003 | Knockeart et al. | 342/357.09 |
| 6,636,790 | B1 | 10/2003 | Lightner et al. | 701/33 |
| 6,664,897 | B2 | 12/2003 | Pape et al. | 340/573.3 |
| 6,671,646 | B2 | 12/2003 | Manegold et al. | 702/127 |
| 6,680,694 | B1 | 1/2004 | Knockeart et al. | 342/357.09 |
| 6,708,113 | B1 | 3/2004 | Von Gerlach et al. | 701/210 |
| 6,714,857 | B2 * | 3/2004 | Kapolka et al. | 701/123 |

(56) References Cited

U.S. PATENT DOCUMENTS

| | | | |
|---|---|---|---|
| 6,714,859 B2 | 3/2004 | Jones | 701/201 |
| 6,727,818 B1 | 4/2004 | Wildman et al. | 340/573.1 |
| 6,732,031 B1 | 5/2004 | Lowrey et al. | 701/33 |
| 6,732,032 B1 | 5/2004 | Banet et al. | 701/33 |
| 6,744,352 B2 | 6/2004 | Lesesky et al. | 340/431 |
| 6,754,183 B1 | 6/2004 | Razavi et al. | 370/254 |
| 6,768,994 B1 | 7/2004 | Howard et al. | 707/10 |
| 6,801,841 B2 | 10/2004 | Tabe | 701/29 |
| 6,804,606 B2 | 10/2004 | Jones | 701/213 |
| 6,804,626 B2 | 10/2004 | Manegold et al. | 702/182 |
| 6,816,762 B2 | 11/2004 | Hensey et al. | 701/35 |
| 6,834,259 B1 | 12/2004 | Nicholson et al. | 702/187 |
| 6,839,619 B2* | 1/2005 | Bellinger | 701/103 |
| 6,856,820 B1 | 2/2005 | Kolls | 455/575.9 |
| 6,876,642 B1 | 4/2005 | Adams et al. | 370/338 |
| 6,879,894 B1 | 4/2005 | Lightner et al. | 701/33 |
| 6,880,390 B2 | 4/2005 | Emord | 701/103 |
| 6,894,617 B2 | 5/2005 | Richman | 340/573.1 |
| 6,899,151 B1 | 5/2005 | Latka et al. | 141/392 |
| 6,904,359 B2 | 6/2005 | Jones | 701/204 |
| 6,909,947 B2 | 6/2005 | Douros et al. | 701/29 |
| 6,924,750 B2 | 8/2005 | Flick | 340/459 |
| 6,928,348 B1 | 8/2005 | Lightner et al. | 701/33 |
| 6,946,953 B2 | 9/2005 | Lesesky et al. | 340/431 |
| 6,952,645 B1 | 10/2005 | Jones | 701/201 |
| 6,954,689 B2 | 10/2005 | Hanson et al. | 701/33 |
| 6,957,133 B1 | 10/2005 | Hunt et al. | 701/29 |
| 6,972,668 B2 | 12/2005 | Schauble | 340/438 |
| 6,988,033 B1 | 1/2006 | Lowrey et al. | 701/123 |
| 7,022,018 B2 | 4/2006 | Koga | 464/52 |
| 7,027,955 B2 | 4/2006 | Markwitz et al. | 702/187 |
| 7,048,185 B2 | 5/2006 | Hart | 235/384 |
| 7,068,301 B2 | 6/2006 | Thompson | 348/141 |
| 7,103,460 B1 | 9/2006 | Breed | 701/29 |
| 7,113,127 B1 | 9/2006 | Banet et al. | 342/357.09 |
| 7,117,121 B2 | 10/2006 | Brinton et al. | 702/182 |
| 7,155,199 B2 | 12/2006 | Zalewski et al. | 455/403 |
| 7,171,372 B2 | 1/2007 | Daniel et al. | 705/8 |
| 7,174,243 B1 | 2/2007 | Lightner et al. | 701/33 |
| 7,174,277 B2 | 2/2007 | Vock et al. | 702/188 |
| 7,225,065 B1 | 5/2007 | Hunt et al. | 701/29 |
| 7,228,211 B1 | 6/2007 | Lowrey et al. | 701/29 |
| 7,254,516 B2 | 8/2007 | Case, Jr. et al. | 702/182 |
| 7,343,252 B2 | 3/2008 | Wiens | 702/54 |
| 7,362,229 B2 | 4/2008 | Brinton et al. | 340/572.1 |
| 7,447,574 B1 | 11/2008 | Washicko et al. | 701/29 |
| 7,477,968 B1 | 1/2009 | Lowrey et al. | 701/29 |
| 7,480,551 B1 | 1/2009 | Lowrey et al. | 701/29 |
| 7,523,159 B1 | 4/2009 | Williams et al. | 709/203 |
| 7,532,962 B1 | 5/2009 | Lowrey et al. | 701/29 |
| 7,532,963 B1 | 5/2009 | Lowrey et al. | 701/29 |
| 7,596,437 B1 | 9/2009 | Hunt et al. | 701/29 |
| 7,604,169 B2 | 10/2009 | Demere | 235/384 |
| 7,627,546 B2 | 12/2009 | Moser et al. | 707/1 |
| 7,640,185 B1 | 12/2009 | Giordano et al. | 705/23 |
| 7,650,210 B2 | 1/2010 | Breed | 701/29 |
| 7,672,756 B2 | 3/2010 | Breed | 701/29 |
| 7,672,763 B1 | 3/2010 | Hunt et al. | 701/29 |
| 7,778,752 B1 | 8/2010 | Hunt et al. | 701/36 |
| 7,783,507 B2 | 8/2010 | Schick et al. | 705/1 |
| 7,841,317 B2* | 11/2010 | Williams et al. | 123/304 |
| 7,913,664 B2* | 3/2011 | Williams et al. | 123/304 |
| 8,090,598 B2* | 1/2012 | Bauer et al. | 705/4 |
| 8,527,132 B2* | 9/2013 | Mineta | 701/25 |
| 2001/0047283 A1 | 11/2001 | Melick et al. | 705/8 |
| 2001/0053983 A1 | 12/2001 | Reichwein et al. | 705/1 |
| 2002/0016655 A1 | 2/2002 | Joao | 701/35 |
| 2002/0022979 A1 | 2/2002 | Whipp et al. | 705/5 |
| 2002/0107833 A1 | 8/2002 | Kerkinni | 707/104.1 |
| 2002/0107873 A1 | 8/2002 | Winkler et al. | 707/1 |
| 2002/0111725 A1 | 8/2002 | Burge | 701/4 |
| 2002/0133275 A1 | 9/2002 | Thibault | 701/35 |
| 2002/0150050 A1 | 10/2002 | Nathanson | 709/226 |
| 2002/0178147 A1 | 11/2002 | Arroyo et al. | 707/2 |
| 2003/0030550 A1 | 2/2003 | Talbot | 340/433 |
| 2003/0120745 A1 | 6/2003 | Katagishi et al. | 709/217 |
| 2003/0163249 A1* | 8/2003 | Kapolka et al. | 701/123 |
| 2004/0236596 A1 | 11/2004 | Chowdhary et al. | 705/1 |
| 2005/0010479 A1* | 1/2005 | Hannigan et al. | 705/19 |
| 2005/0072384 A1* | 4/2005 | Hadley et al. | 123/1 A |
| 2005/0273250 A1 | 12/2005 | Hamilton et al. | 701/200 |
| 2006/0232406 A1 | 10/2006 | Filibeck | 340/572.1 |
| 2007/0050193 A1* | 3/2007 | Larson | 705/1 |
| 2007/0069947 A1 | 3/2007 | Banet et al. | 342/357.09 |
| 2007/0179709 A1 | 8/2007 | Doyle | 701/209 |
| 2008/0154489 A1 | 6/2008 | Kaneda et al. | 701/201 |
| 2008/0154712 A1 | 6/2008 | Wellman | 705/11 |
| 2008/0319665 A1 | 12/2008 | Berkobin et al. | 701/213 |
| 2009/0069999 A1 | 3/2009 | Bos | 701/102 |
| 2009/0177350 A1 | 7/2009 | Williams et al. | 701/29 |
| 2009/0222200 A1 | 9/2009 | Link, II et al. | 701/202 |
| 2010/0088127 A1 | 4/2010 | Betancourt et al. | 705/5 |

FOREIGN PATENT DOCUMENTS

| | | | |
|---|---|---|---|
| CA | 2326892 | 6/2005 | G07C 1/20 |
| EP | 0 755 039 | 6/1996 | G08G 1/01 |
| EP | 0 814 447 | 5/1997 | G08G 1/0968 |
| EP | 1 067 498 | 7/2000 | G08G 1/127 |
| EP | 1 271 374 | 6/2002 | G06F 17/60 |
| EP | 0 926 020 | 9/2002 | B60R 25/00 |
| EP | 1 005 627 | 10/2003 | G01C 21/00 |
| EP | 1 027 792 | 1/2004 | H04L 29/06 |
| EP | 2 116 968 | 11/2009 | G06Q 30/00 |
| WO | WO 97/26750 | 7/1997 | H04M 11/00 |
| WO | WO 98/03952 | 1/1998 | G08G 1/127 |
| WO | WO 98/30920 | 7/1998 | |
| WO | WO 03/023550 | 3/2003 | |
| WO | WO 2007/092711 | 8/2007 | |

OTHER PUBLICATIONS

Miras. "About SPS Technologies." 1pg., May 7, 1999.
Miras. "How MIRAS Works." 1pg., Apr. 29, 1999.
Miras. "Miras 4.0 Screenshot." 1pg., May 7, 1999.
Miras. "MIRAS Unit." 1pg., May 4, 1999.
Miras. "Monitoring Vehicle Functions." 1pg., Apr. 27, 1999.
Miras. "Remote Control." 1pg., Apr. 29, 1999.
Miras. "Tracking & Monitoring Software." 1pg., Apr. 29, 1999.
Sterzbach et al., "A Mobile Vehicle On-Board Computing and Communication System." Comput. & Graphics, vol. 20, No. 4: 659-667, 1996.
Zujkowski, Stephen. "Savi Technolgy, Inc.: Savi Security and Productivity Systems." ATA Security Forum 2002, Chicago, IL: 21pp., May 15, 2002.
N.a., "Private fleets moving to wireless communications." FleetOwner, 4pp. <www.driversmag.com/ar/fleet_private_fleets_moving/index.html> 1997.
N.a., "MIRAS GPS vehicle tracking using the Internet." Business Wire, 2pp., Nov. 22, 1996.
Albright, B., "Indiana Embarks on Ambitious RFID roll out." Frontline Solutions. May 20, 2002; 2pp. Available at: <http://www.frontlinetoday.com/frontline/article/articleDetail.jsp?id=19358>.
Anonymous, "Transit agency builds GIS to plan bus routes." American City & County. vol. 118, No. 4. Published Apr. 1, 2003. 4pp. NDN-258-0053-0664-6.
Contact: GCS (UK), Tewkesbury Gloucestershire. Dec. 11, 2002. 2pp. Copyright © 2000 GCS General Control Systems <http://www.gcs.at?eng/newsallegemein.htm>.
"Detex Announces the Latest Innovation in Guard Tour Verification Technology." *DETEX Life Safety, Security and Security Assurance*. Jan. 1, 2003. 1pp. © 2002-204 Detex Corporation. <http://www.detex.com/NewsAction.jspa?id=3>.
"D.O.T. Driver Vehicle Inspection Reports on your wireless phone!" *FleeTTrakkeR $_{LLC}$ 2002-2003 FleeTTrakkeR $_{LLC}$*. All rights reserved <http://www._fleettrakker.com/web/indexjsp> Accessed Mar. 12, 2004.
Dwyer et al., Abstract: "Analysis of the Performance and Emissions of Different bus Technologies on the city of San Francisco Routes."

(56) References Cited

OTHER PUBLICATIONS

Technical paper published by Society of Automotive Engineers, Inc. Published Oct. 26, 2004. 2pp. NDN-116-0014-3890-6.

Guensler et al., "Development of a Comprehensive Vehicle Instrumentation Package for Monitoring Individual Tripmaking Behavior." *Georgia Institute of Technology: School of Civil and Environmental Engineering*: 31pp., Feb. 1999.

Jenkins et al., "Real-Time Vehicle Performance Monitoring Using Wireless Networking." *IASTED International Conference on Communications, Internet and Information Technology*: 375-380, Nov. 22-24, 2004.

Kurtz, J., "Indiana's E-Government: A Story Behind It;s Ranking " *INCONTEXT Indiana's Workforce and Economy*. Jan.-Feb. 2003 vol. 4, No. 5pp. Available at <http://www.incontext.indiana.edu/2003/jan-feb03/government.html>.

Kwon, W., "Networking Technologies of In-Vehicle." *Seoul National University: School of electrical engineering*: 44pp., Mar. 8, 2000.

"Nextel, Motorola and Symbol Technologies Offer First Wireless Bar Code Scanner for Mobile Phones." Jun. 11, 2003. <http://theautochannel.com/news/2003/06/11/162927.htm>.

"OBD Up." *Motor*: 28-34, Jul. 1998.

Quaan et al., "Guard Tour Systems." *Security Management ONLINE*. Sep. 16, 2003. 1pg. © 2000 <http://www.securitymanagement.com/ubb/Forum30/HTML/000066.html>.

Qualcomm. "Object FX Integrates TrackingAdvisor with QUALCOMM's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

Senger, N., "Inside RF/ID: Carving a Niche Beyond Asset Tracking " *Business Solutions*. Feb. 1999: 5pp. Available at: <http://www.businesssolutionsmag.com/Articles/1999_02/990208.html>.

"The Data Acquisition Unit Escorte." *The Proxi Escort.com*. Nov. 20, 2001. 4pp. Copyright © 2000 GCS General Control Systems. <http://www.gcs.at/eng/produkte/hw/escorte.htm>.

"The PenMaster" and "The PSION Workabout." Copyright 2000 GCS General Control Systems. <http://www.gcs.at/eng/produkte/hw/pebnaster.htm>.

Tiscor: The Mobile Software Solutions Provider. *Inspection Manager: An Introduction*. Sep. 27, 2004. Slide presentation; 19pp. Available: www.TISCOR.com.

Tiscor: Inspection Manager 6.0 User Guide. USA; 2004. 1-73.

"Tracking out of route: software helps fleets compare planned routes to actual miles. (TECHNOLOGY)." *Commercial Carrier Journal*. Published Oct. 1, 2005. 4pp. NDN-219-1054-1717-0.

Tsakiri et al., Abstract: "Urban fleet monitoring with GPS and GLONASS." *Journal of Navigation*, vol. 51, No. 3. Published Sep. 1998. 2pp. NDN-174-0609-4097-3.

Tuttle, J., "Digital RF/ID Enhances GPS" Proceedings of the Second Annual Wireless Symposium, pp. 406-411, Feb. 15-18, 1994, Santa Clara, CA.

Want, R., "RFID A Key to Automating Everything." *Scientific American*, Jan. 2004, p. 58-65.

"What is the Child Check-Mate Safety System"? 2002 © *Child Checkmate Systems Inc.* <http://www.childcheckmate.com/what.html>.

\* cited by examiner

US 9,230,437 B2

METHOD AND APPARATUS TO ENCODE FUEL USE DATA WITH GPS DATA AND TO ANALYZE SUCH DATA

RELATED APPLICATIONS

This application is a continuation-in-part of prior co-pending application Ser. No. 12/724,232, filed on Mar. 15, 2010, the benefit of the filing date of which is hereby claimed under 35 U.S.C. §120. Prior co-pending application Ser. No. 12/724,232 itself is a continuation-in-part of prior co-pending application Ser. No. 11/675,502, filed on Feb. 15, 2007 and issued as U.S. Pat. No. 7,680,595 on Mar. 16, 2010, the benefit of the filing date of which is hereby claimed under 35 U.S.C. §120. Prior co-pending application Ser. No. 11/675,502 itself is a continuation-in-part of prior co-pending application Ser. No. 11/425,222, filed on Jun. 20, 2006, and issued as U.S. Pat. No. 7,564,375 on Jul. 21, 2009, the benefit of the filing date of which is hereby claimed under 35 U.S.C. §120.

BACKGROUND

As the cost of sensors, communications systems and navigational systems has dropped, operators of commercial and fleet vehicles now have the ability to collect a tremendous amount of data about the vehicles that they operate, including geographical position data (generally referred to herein as GPS data, noting that position data can be collected by systems related to but distinct from the well known Global Positioning System) collected during the operation of the vehicle.

Vehicle fleet operators often operate vehicles along pre-defined and generally invariant routes. For example, buses frequently operate on predefined routes, according to a pre-defined time schedule (for example, along a route that is geographically, as well as temporally defined). It would be desirable to provide new techniques for analyzing data collected from vehicles transiting such predefined routes over time, to aid in identifying vehicle performance problems requiring servicing.

Vehicle fleet operators often operate vehicles both on road and off road. Significantly, fuel tax is calculated differently for on road and off road use. It would be desirable to provide new techniques for analyzing data collected from vehicles operating both on road and off road, to enable fuel tax calculations to be performed more accurately.

SUMMARY

One aspect of the novel concepts presented herein is a method of combining fuel use data collected by a vehicle's fuel injector with position data collected during operation of the vehicle, to generate fuel use encoded position data. Such fuel use encoded position data preferably is four dimensional: position (latitude & longitude), time, fuel injector data, and odometer data. Generating such data requires the vehicle to be equipped with a position sensing system (able to determine the vehicle's latitude & longitude per unit of time), and a sensor incorporated into at least one fuel injection component, to enable an amount of fuel introduced into the vehicle's engine to be determined per unit of time. Diesel engines that include fuel injectors configured to collect information about the flow of fuel through the injectors per unit of time are currently available. In an exemplary, but not limiting embodiment, the odometer data is collected from the vehicle computer using a J-1708 or J-1939 bus. While including the odometer data is likely to be popular with end users, it should be understood that the concepts disclosed herein also encompass embodiments in which the odometer data is not included in the fuel use encoded position data.

Such fuel use encoded position data has a number of uses. The data can be used to determine fuel usage of the vehicle under many different search parameters. For example, many commercial trucks are used both on and off road. Diesel fuel for highway use is taxed at a much higher rate than diesel fuel for non-highway use (diesel for off road use is generally exempt from Federal and State road taxes). The fuel use encoded position data can be used to calculate how much diesel fuel is consumed when the vehicle is not on the highway (i.e., when the lower tax rate applies). Normally this metric is calculated using an average MPG. If the off-road trip was 20 miles round trip and the vehicle MPG averages 10 MPG, then 2 gallons of diesel were assumed to be used. That calculation is very error prone. Off road fuel consumption is often higher for a number of reasons. Road condition is poorer, so fuel consumption generally is higher. Many commercial vehicles going off road are maintenance vehicles equipped with power take off units, which use engine power to do mechanical work other than driving road wheels. Thus, even when the vehicle is not moving, the engine is often consuming fuel to power ancillary equipment. A mileage based calculation will not take into account the fuel consumed off road when the vehicle is stationary, but consuming fuel to power equipment.

The fuel use encoded position data can also be used to evaluate the mechanical condition of a vehicle. Assume a vehicle travels from point A to point B consistently. By monitoring fuel use for that trip over a period of time, a decrease in fuel efficiency may indicate a mechanical problem (dirty injectors, fouled spark plugs, etc).

Yet another use for the fuel use encoded position data is to provide a data set to be used to analyze fuel consumption relative to elevation change. By quantifying how much fuel is consumed traveling over a route with elevation changes, one can identify alternate, possibly longer routes, that are more fuel efficient, due to fewer elevation changes. A related use for the fuel use encoded position data is to provide a data set to be used to analyze fuel consumption relative to road surface. Analyzing fuel consumption relative to the type of road surface will enable vehicle operators to learn what road types surfaces are associated with lower fuel consumption. Regularly traveled routes can then be analyzed to determine if an alternate route over different road surfaces could lead to lower fuel consumption. Correlating the fuel use encoded position data with vehicle loading data can also facilitate analysis of fuel consumption not only based on elevation and road surface, but vehicle loading as well.

It should be recognized that one aspect of the concepts disclosed herein is a method for generating fuel use encoded position data by combining fuel usage data (per unit of time) collected by fuel injectors with position data (per unit of time). Another aspect of the concepts disclosed herein is a method for collecting fuel use encoded position data at a remote computer, by wirelessly transmitting the fuel use encoded position data from the vehicle to a remote computer in real-time. The term real-time is not intended to imply the data is transmitted instantaneously, rather the data is collected over a relatively short period of time (over a period of seconds or minutes), and transmitted to the remote computing device on a ongoing basis, as opposed to storing the data at the vehicle for an extended period of time (hour or days), and transmitting an extended data set to the remote computing device after the data set has been collected. Transmitting fuel use encoded position data at a later time, rather than in real time, is encompassed by the concepts disclosed herein, although real-time data transmission is likely to be popular with users.

Another aspect of the concepts disclosed herein is a method for using fuel use encoded position data to calculate fuel use taxes. While the fuel tax calculations could be performed by a processor in the vehicle, in a preferred but not limiting embodiment, the fuel use encoded position data will be transferred to the remote computing device for storage, such that the fuel use encoded position data for a particular vehicle can be accessed at a later time to perform the fuel tax calculations. It should be understood that the term remote computer and the term remote computing device are intended to encompass networked computers, including servers and clients, in private networks or as part of the Internet. The fuel use encoded position data can be stored by one element in such a network, retrieved for review by another element in the network, and analyzed by yet another element in the network. In at least one embodiment, a vendor is responsible for storing the data, and clients of the vendor are able to access and manipulate the fuel use encoded position data.

Still another aspect of the concepts disclosed herein is a method for using fuel use encoded position data to diagnose a relative mechanical condition of a vehicle that repetitively travels a specific route. Fuel use encoded position data for different trips can be compared. Changes in fuel use encoded position data can indicate that a fuel efficiency of the vehicle has decreased over time, indicating that the vehicle should be inspected for mechanical conditions (such as dirty fuel filters, dirty air filters, and/or clogged fuel injectors, noting that such examples are not intended to be limiting) that may be contributing to a reduction in fuel efficiency.

Still another aspect of the concepts disclosed herein is a method for enabling a user to define specific parameters to be used to analyze such fuel use encoded position data. In an exemplary embodiment, a user can define a geographical parameter, and analyze the fuel use encoded position data in terms of the user defined geographical parameter. In an exemplary embodiment, the geographical parameter is a geofence, which can be generated by displaying a map to a user, and enabling the user to define a perimeter "fence" around any portion of the map. Having defined the geofence, the user can then analyze the fuel use encoded position data for the vehicle, such that only the portion of the fuel use encoded position data whose geographical/position data falls within the confines of the geofence is included in the analysis. One such analysis can be fuel tax calculations, where the geofence is used to define off road vehicular use. Another such analysis can be to determine how fuel use patterns change over time, where the geofence is used to define a specific route (such as a bus route or an invariant delivery route). In another exemplary embodiment, the geographical parameter is a set of geographical coordinates. As discussed above, some vehicles regularly travel a predefined route, and the predefined route can be defined by a set of geographical coordinates that the vehicle encounters whenever transiting that route. Larger data sets will include more geographical coordinates. A relatively larger set of geographical coordinates will be generated if the set of geographical coordinates includes individual geographical coordinates separated from one another by 25 feet. A relatively smaller set of geographical coordinates will be generated if the set of geographical coordinates includes individual geographical coordinates from each intersection at which the vehicle makes a turn or change in direction (such that geographical coordinates defining where the vehicle enters and exits a relatively long street can be separated from one another by relatively long distances). Such a set of geographical coordinates can be considered to define a fingerprint for a specific route. An exemplary analysis of fuel use encoded position data where the geographical parameter is a route fingerprint is to determine how fuel use patterns change over time as the route is completed at different times. Changes in fuel use patterns can indicate that a fuel efficiency of the vehicle has decreased over time, indicating that the vehicle should be inspected for mechanical conditions, generally as discussed above.

In addition to being implemented as a method, the concepts disclosed herein can also be implemented as a memory medium storing machine instructions that when executed by a processor implement the method, and by a system for implementing the method. In such a system, the basic elements include a vehicle that is to be operated by a vehicle operator, data collection components in the vehicle (injectors that collect fuel use data per unit time, and a geographical position tracking unit, such as a GPS tracking device), a processor for combining the different data types into time indexed fuel use encoded position data (such a processor could be part of the GPS unit), a data link (which in an exemplary embodiment is integrated into the GPS unit as a wireless data link), and a remote computing device. In general, the remote computing device can be implemented by a computing system employed by an entity operating a fleet of vehicles. Entities that operate vehicle fleets can thus use such computing systems to track and process data relating to their vehicle fleet. It should be recognized that these basic elements can be combined in many different configurations to achieve the exemplary method discussed above. Thus, the details provided herein are intended to be exemplary, and not limiting on the scope of the concepts disclosed herein.

The above noted method is preferably implemented by a processor (such as computing device implementing machine instructions to implement the specific functions noted above) or a custom circuit (such as an application specific integrated circuit).

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is a high level logic diagram showing exemplary overall method steps implemented in accord with the concepts disclosed herein to combine fuel use data collected from a fuel injector with geographical position data collected while a vehicle is in operation, to generate fuel use encoded position data, which can be subsequently analyzed to determine at least one operational parameter of the vehicle;

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive. Further, it should be understood that any feature of one embodiment disclosed herein can be combined with one or more features of any other embodiment that is disclosed, unless otherwise indicated.

As used herein and in the claims that follow, the term off road is intended to refer to use of a vehicle where fuel consumed by that vehicle should be assessed a tax using a tax rate different than fuel consumed by the same vehicle when traveling over a public highway. The concepts disclosed herein can help vehicle operators more accurately determine how to calculate the correct fuel tax, where a vehicle is used both on and off road.

As used herein and in the claims that follow, the term route is intended to refer to a route between a starting location and an ending location that is intended to be traversed a plurality of times. For example, bus operators generally operate buses on a number of different specific routes, which are generally differentiated by a route number. A bus Route 51 might connect a shopping mall and an airport, while a bus Route 52 might connect the airport to a university. Route 51 and Route 52 are each different routes. A route may include one or more intermediate locations disposed between the starting location and the ending location, such intermediate locations representing geographical locations that the route intersects. Each route can be defined by a plurality of geographical coordinates through which a vehicle will pass when traversing the route. As such, a set of position data collected during the operation of a vehicle can be used to define a route.

Figure 1:
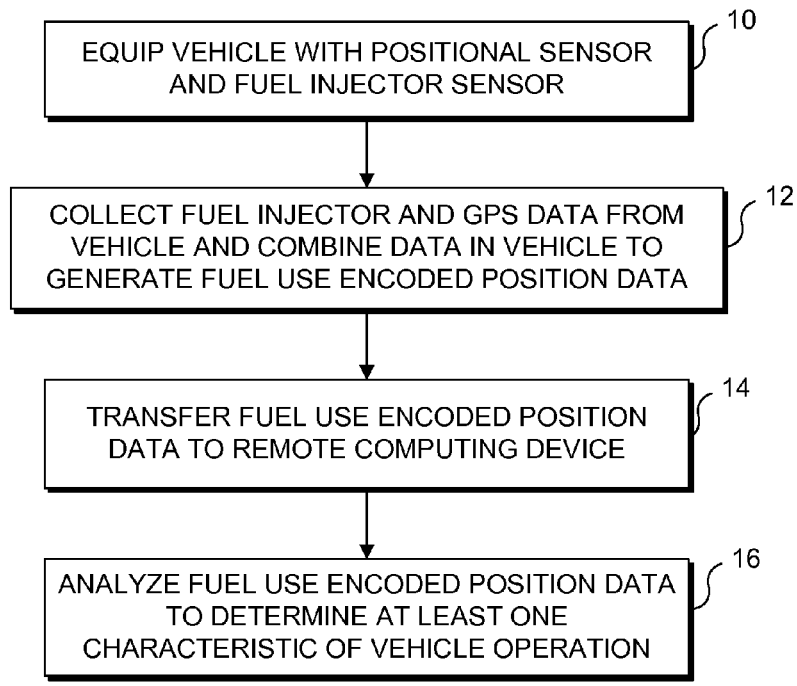

FIG. 1 is a high level flow chart showing the overall method steps implemented in accord with one aspect of the concepts disclosed herein, to collect fuel use data from a fuel injector sensor and position data, then combine the data to generate fuel use encoded position data, which can be analyzed to determine at least one operating characteristic of the vehicle. In a block 10, a vehicle is equipped with geographical position sensors (such as a GPS unit), so that geographical position data can be collected when the vehicle is being operated, and a fuel injector that measures a quantity of fuel flowing through the fuel injector. Mercedes Benz manufactures diesel engines that incorporate fuel injectors capable of providing such fuel use data. Other vendors will likely offer engines having similar functionality. In general, each fuel injector in the vehicle will include such a fuel sensor. However, it should be recognized that less than all of the fuel injectors can include such sensors, so long as the data for the engine's fuel use is adjusted to compensate (i.e., an engine with four injectors, only one of which includes a fuel sensor, should have its measured fuel use increased four fold to account for fuel flow through the unmonitored injectors). In an exemplary but not limiting embodiment, fuel injector data is collected from the vehicle computer using either a J-1708 or J-1939 bus. The data values are generally in English units using the J-1708 bus and metric units using the J-1939 bus. The J-1939 bus provides fuel injector data with ½ liter resolution. In general, the vehicle computer will receive from usage data from each cylinder's fuel injector. It would be possible to collect fuel use data from only a single injector in a multi-cylinder engine, and then increase that data by a factor corresponding to the number of cylinders. Similarly, data could be collected from ½ of the injectors, and then doubled to normalize the data for fuel use in all cylinders.

In a block 12, the vehicle is operated while collecting both GPS data (i.e., position data, preferably including time indexed longitude and latitude data) and fuel use data (as measured through the fuel injectors). The different types of data are combined into a time indexed data set. In an exemplary embodiment, the different types of data (position and fuel use) are combined by a geographical position sensing system, an exemplary implementation of which is discussed in detail below, to generate fuel use encoded position data.

In a block 14, the fuel use encoded position data collected during operation of the vehicle is conveyed to a remote computing device. In one exemplary, but not limiting embodiment, the fuel use encoded position data is wirelessly transmitted to the remote computing device on the fly (i.e., as the information is generated). In such an embodiment, it may be desirable to store a copy of the fuel use encoded position data at the vehicle in case of a failure in the transmission of the data stream. In another exemplary embodiment, the fuel use encoded position data is stored in the vehicle, and conveyed to the remote computing device at a later time.

In a block 16, the fuel use encoded position data conveyed to the remote computing device is analyzed to determine at least one operational characteristic of the vehicle. The fuel use encoded position data can be used to determine fuel usage of the vehicle under many different search parameters. In a first exemplary embodiment, the fuel use encoded position data is used to calculate the correct fuel tax for the vehicle, based on an analysis of where the vehicle was located during fuel use. Commercial trucks are often used both on and off road. Diesel fuel for highway use is taxed at a much higher rate than diesel fuel for non-highway use. In this embodiment, the fuel use encoded position data is used to calculate how much diesel fuel is consumed when the vehicle is not on the highway (i.e., when the lower tax rate applies). Simple average MPG estimates are error prone, as off road fuel consumption is often higher that highway fuel consumption (road condition is poorer, and off road vehicle use frequently includes using engine power to do mechanical work other than driving road wheels). It should also be recognized that the fuel use encoded position data can also be used to determine how much fuel is used on public roadways (where the fuel use tax is higher), and to determine the off road fuel use by subtracting the fuel used on public roadways from the total fuel use to determine the off road fuel use.

In a second exemplary embodiment, the fuel use encoded position data is used to determine how much fuel is used consumed during idle time (such as when a vehicle is parked and the engine is not shut off). Fleet operators want to reduce idle time, as idle time waste fuel and increases costs. Fuel use during idle time can be calculated in a number of ways. Certain geographical positions (fleet yards, truck stops, loading and unloading points) can be designated for review, such that fuel use from the fuel use encoded position data is extracted for the designated geographical positions, and used to determine how much fuel is consumed at those locations. Alternatively, the fuel use encoded position data can be analyzed to determine how much fuel is consumed when the vehicle is on but its position remains the same (this latter technique is over inclusive, as it may include fuel use required to power equipment needed while the vehicle is stationary, as well as fuel use while the vehicle is stopped for traffic and shutting down the vehicle is not practical). The over inclusiveness of the latter technique can be managed by eliminating geographical positions where fuel was used to power equipment, or geographical positions where fuel was used while sitting in traffic.

In a third exemplary embodiment, the fuel use encoded position data is used to evaluate (or to monitor) changes in fuel use patterns for a vehicle regularly traveling the same route. Changes in such fuel use patterns can be indicative of mechanical problems, such that when such changes are identified, it may be prudent to schedule maintenance for the vehicle. Assume a vehicle travels from point A to point B consistently. By monitoring fuel use for that trip over a period of time, a decrease in fuel efficiency may indicate a mechanical problem (dirty injectors, fouled spark plugs, etc). Of course, such fuel use changes may be attributable to other conditions, such as changes in traffic patterns (heavy traffic encountered during one trip will increase fuel use) or changes in vehicle loading (a trip with a heavy load will likely consume more fuel than a trip for a light load). Historical traffic data and loading data can be used to more clearly target fuel use pattern changes likely to be correlated to mechanical condition.

Figure 2:
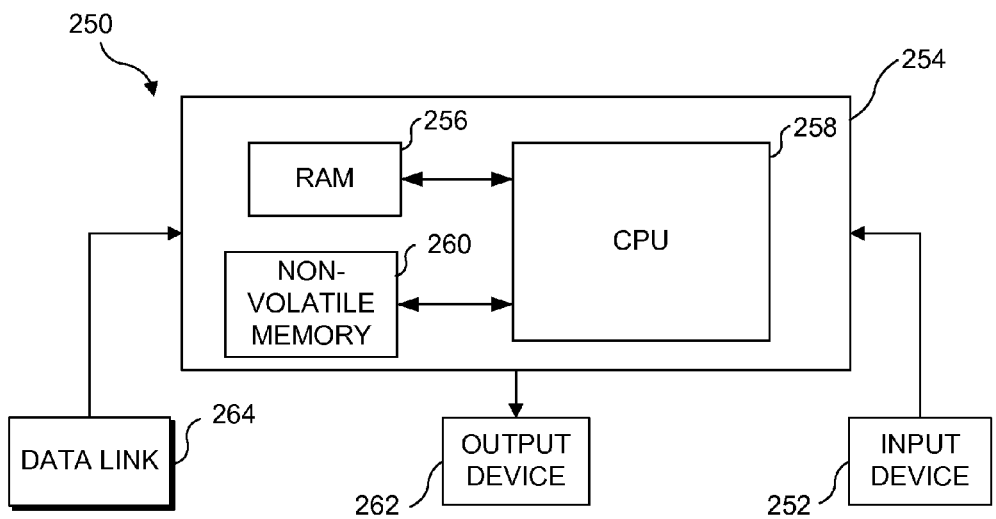
FIG. 2 is a functional block diagram of an exemplary computing device that can be employed to implement some of the method steps disclosed herein.

In general, analysis of the fuel use encoded position data will be carried out by a remote computing device. The remote computing device in at least one embodiment comprises a computing system controlled or accessed by the fleet operator. The remote computing device can be operating in a networked environment, and in some cases, may be operated by a third party under contract with the fleet operator to perform such services. FIG. 2 schematically illustrates an exemplary computing system 250 suitable for use in implementing the method of FIG. 1 (i.e., for executing block 16 of FIG. 1). Exemplary computing system 250 includes a processing unit 254 that is functionally coupled to an input device 252 and to an output device 262, e.g., a display (which can be used to output a result to a user, although such a result can also be stored). Processing unit 254 comprises, for example, a central processing unit (CPU) 258 that executes machine instructions for carrying out an analysis of fuel use encoded position data collected in connection with operation of the vehicle to determine at least one operating characteristic of the vehicle. The machine instructions implement functions generally consistent with those described above with respect to block 16 of FIG. 1, as well as those described below in blocks 30-38, with respect to FIG. 6. CPUs suitable for this purpose are available, for example, from Intel Corporation, AMD Corporation, Motorola Corporation, and other sources, as will be well known to those of ordinary skill in this art.

Also included in processing unit 254 are a random access memory (RAM) 256 and non-volatile memory 260, which can include read only memory (ROM) and may include some form of memory storage, such as a hard drive, optical disk (and drive), etc. These memory devices are bi-directionally coupled to CPU 258. Such storage devices are well known in the art. Machine instructions and data are temporarily loaded into RAM 256 from non-volatile memory 260. Also stored in the non-volatile memory are an operating system software and ancillary software. While not separately shown, it will be understood that a generally conventional power supply will be included to provide electrical power at voltage and current levels appropriate to energize computing system 250.

Input device 252 can be any device or mechanism that facilitates user input into the operating environment, including, but not limited to, one or more of a mouse or other pointing device, a keyboard, a microphone, a modem, or other input device. In general, the input device will be used to initially configure computing system 250, to achieve the desired processing. Configuration of computing system 250 to achieve the desired processing includes the steps of loading appropriate processing software into non-volatile memory 260, and launching the processing application (e.g., loading the processing software into RAM 256 for execution by the CPU) so that the processing application is ready for use. Output device 262 generally includes any device that produces output information, but will most typically comprise a monitor or computer display designed for human visual perception of output. Use of a conventional computer keyboard for input device 252 and a computer display for output device 262 should be considered as exemplary, rather than as limiting on the scope of this system. Data link 264 is configured to enable data collected in connection with operation of a vehicle to be input into computing system 250 for subsequent analysis. Those of ordinary skill in the art will readily recognize that many types of data links can be implemented, including, but not limited to, universal serial bus (USB) ports, parallel ports, serial ports, inputs configured to couple with portable memory storage devices, FireWire ports, infrared data ports, wireless data communication such as Wi-Fi and Bluetooth™, network connections via Ethernet ports, and other connections that employ the Internet.

It should be understood that the term remote computer and the term remote computing device are intended to encompass networked computers, including servers and clients, in private networks or as part of the Internet. The fuel use encoded data can be stored by one element in such a network, retrieved for review by another element in the network, and analyzed by yet another element in the network. In at least one embodiment, a vendor is responsible for storing the data, and clients of the vendor are able to access and manipulate the data. While implementation of the method noted above has been discussed in terms of execution of machine instructions by a processor (i.e., the computing device implementing machine instructions to implement the specific functions noted above), the method could also be implemented using a custom circuit (such as an application specific integrated circuit).

Figure 3:
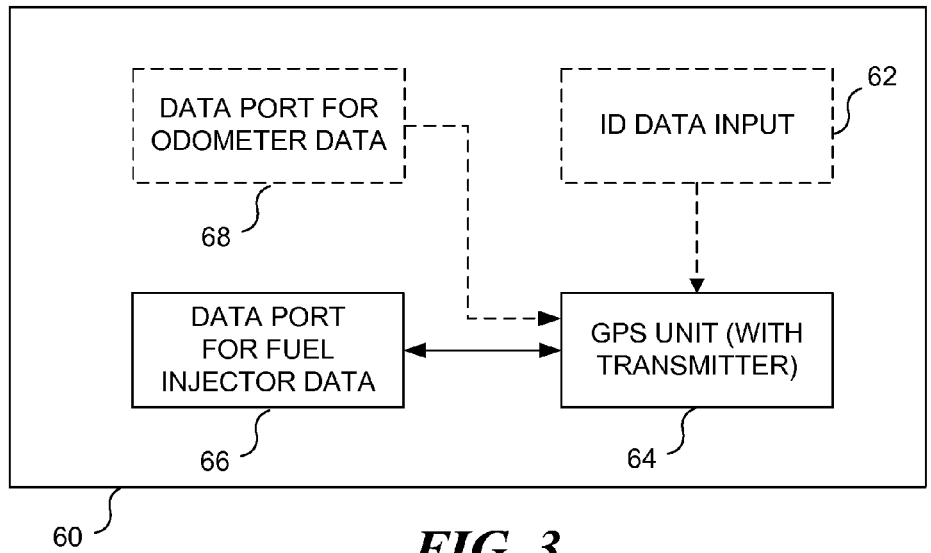
FIG. 3 is a functional block diagram of an exemplary geographical position sensing system employed to implement some of the concepts disclosed herein.

FIG. 3 is a functional block diagram of an exemplary geographical position sensing system employed to implement some of the concepts disclosed herein. A position sensing system 60 includes a GPS component 64 (which in this embodiment, includes a transmitter, although it should be recognized that a GPS unit without a transmitter can be coupled with a transmitter or other data link to achieve similar functionality). Position sensing system 60 optionally includes a data port 68 coupled to the vehicle's odometer (or to the vehicle's on-board computer), so that odometer data can be collected and combined with the fuel use encoded position data. Position sensing system 60 includes a data port 66 coupled to the vehicle's fuel injectors (any fuel injector that includes a fuel use sensor; noting that data port 66 can also be coupled to the vehicle's on-board computer, such that the sensor data from the fuel injectors is first directed to the on-board computer, and then to position sensing system 60). GPS component 64 includes a processor that combines GPS data, fuel use data from the fuel injector sensor(s), and if desired, odometer data, to generate fuel use encoded position data that is time indexed (i.e., such that for a given point in time, one can determine the vehicle's position, the vehicle's fuel use, and optionally the vehicle's odometer reading). In a related embodiment, position sensing system 60 includes a processor separate and distinct from any processor in the GPS unit, such that the separate processor performs the function of combining the GPS data, the fuel use data, and optionally the odometer data. Such a processor can be implemented by a general purpose processor implementing specific machine instructions to execute the intended function, or custom hardware circuit configured to execute the intended function. While odometer data, fuel use data, and position data each could be collected at a different frequencies (i.e., at different times), and combined together to generate the fuel use encoded position data, in an exemplary and preferred embodiment, the odometer data, fuel use data, and position data are collected at the same time, so the time indexing of each data type matches. By collecting the different data types at the same time, one can ensure that the amount fuel use attributed to off road use is as accurate as possible. Note both the fuel use data and the odometer data normally collected by the vehicle are accumulated numerical values, and to record a specific data point one reads those accumulated values and combines them with the time and position data. The purpose of collecting the odometer data is to facilitate calculation of off road fuel use. As noted above, the concepts disclosed herein also encompass embodiments in which the odometer data is not included in the fuel use encoded position data.

If desired, position sensing system 60 can include an ID data input 62 that is used to uniquely identify the vehicle, so that the fuel use encoded position data can be uniquely correlated to a specific vehicle (fleet operators will want to be able to uniquely identify fuel use encoded position data from different fleet vehicles). In one embodiment, ID data input 62 comprises a keyboard or function keys logically coupled to GPS component 64 (or to the separate processor noted above, if implemented). It should be recognized, however, that other data input structures (i.e., structures other than keyboards) can instead be implemented, and that the concepts disclosed herein are not limited to any specific identification data input device. It should also be recognized that GPS component 64 can be configured to include in the GPS data (or in the fuel use encoded position data) a data component that can be used to uniquely correlate fuel use encoded position data with a specific vehicle, such that ID data input 62 is not required. The inclusion of ID data input 62 facilitates the addition of other types of data (such as inspection data) in the fuel use encoded position data.

Figure 4:
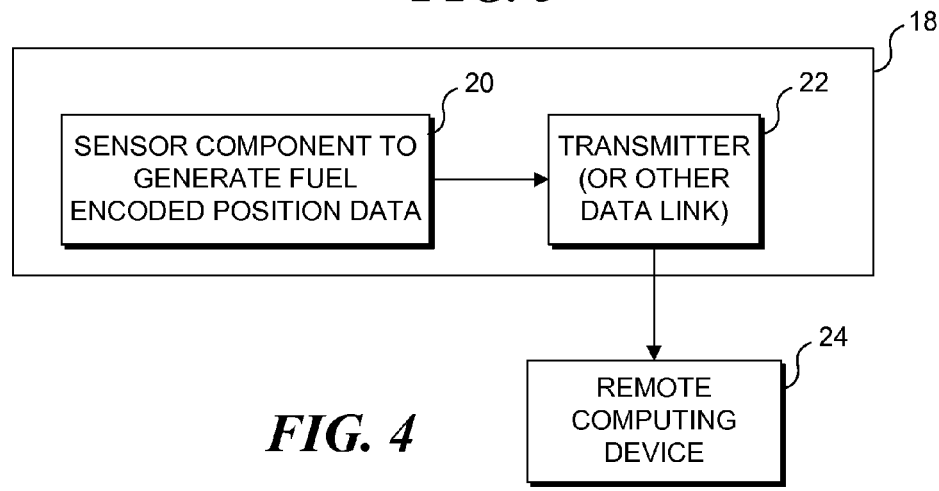
FIG. 4 is an exemplary functional block diagram showing the basic functional components used to implement the method steps of FIG. 1.

FIG. 4 is a functional block diagram of an exemplary system that can be employed to implement the method steps of FIG. 1. The components include a sensor component 20, a transmitter 22, which may also have a corresponding receiver—not shown (or other data link), and a remote computing device 24 (generally as described above). Sensor component 20 includes each element needed to collect the data elements included in the fuel use encoded position data, and a processing element required to combine the different types of sensor data together to generate time indexed fuel use encoded position data. The sensor elements include at least one fuel injector sensor to determine a quantity of fuel passing through an engine fuel injector (noting that each fuel injector in the engine can include the required sensor, or less than all fuel injectors in the engine can include such sensors, so long as the appropriate adjustment is made to the fuel use data to account for injectors that do not include sensors, generally as discussed above). Other types of data from other sensors can also be included in the fuel use encoded position data, including but not being limited to odometer data. As discussed above, the processor for combining the different data types into time indexed fuel use encoded position data can be a separate component or a processor included in a GPS component. Further, it should be recognized that many GPS units are available that already incorporate a transmitter, such that separate transmitter 22 may not be required. It should be understood that the concepts disclosed herein can be used with other types of geographical position sensors/systems, and the use of the term GPS is intended to be exemplary, rather than limiting. Sensor component 20 and a transmitter 22 are part of a vehicle 18.

Figure 5:
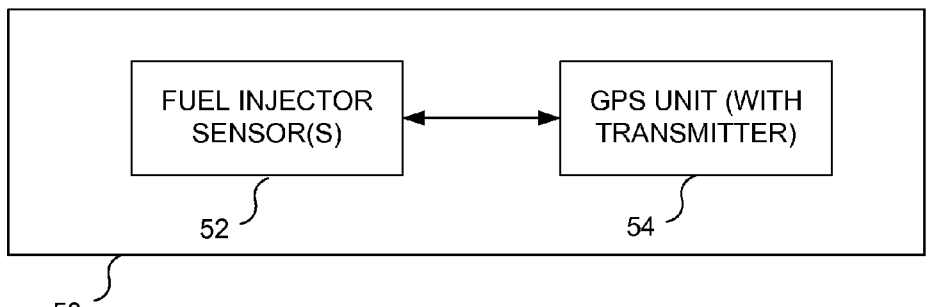
FIG. 5 is a schematic block diagram of an exemplary vehicle configured to collect the fuel use encoded position data employed in the method steps of FIG. 1.

FIG. 5 is a schematic block diagram of an exemplary vehicle configured to collect the fuel use encoded position data employed in the method steps of FIG. 1. A vehicle 50 includes GPS unit 54 (which in this embodiment, includes a transmitter, although it should be recognized that a GPS unit without a transmitter can be coupled with a transmitter or other data link to achieve similar functionality). GPS unit 54 is coupled to fuel injector sensors 52, so that geographical position data and fuel injector data are combined by the GPS unit into fuel use encoded position data. As discussed above, the vehicle can include other sensors (such as an odometer) collecting data that is similarly included in the fuel use encoded position data. Furthermore, the combining of different data types into fuel use encoded position data can be implemented by a processor (not shown in FIG. 5, but discussed above) that is separate from the GPS unit.

Figure 6:
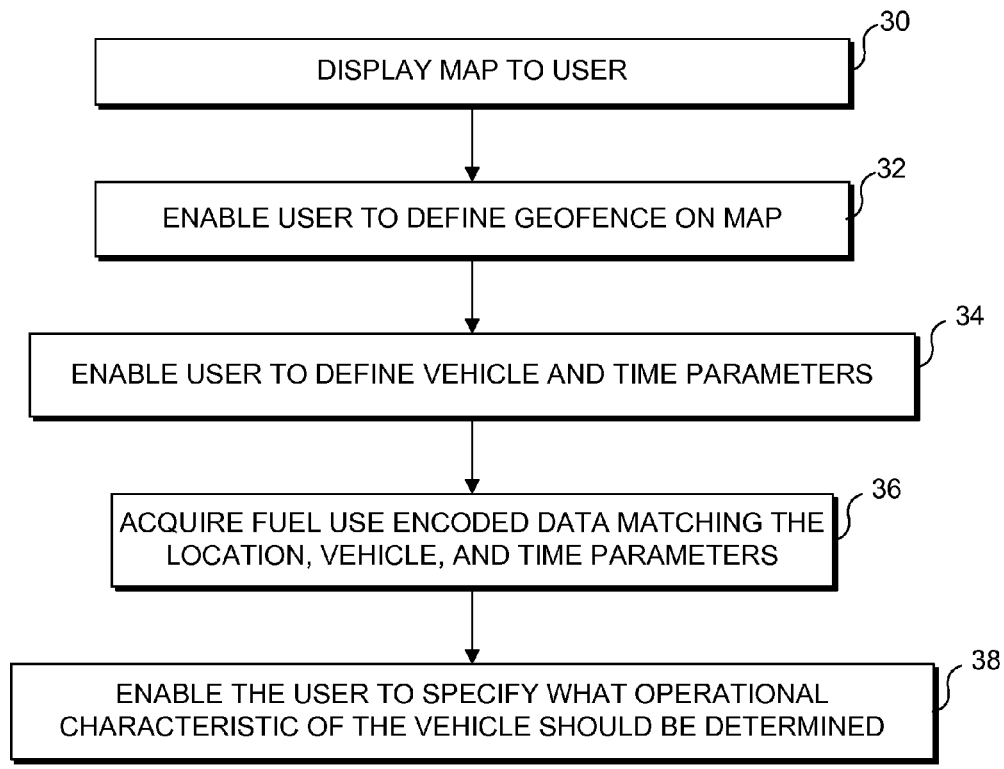
FIG. 6 is a high level logic diagram showing exemplary overall method steps implemented in accord with the concepts disclosed herein, and summarized above, to utilize fuel encoded position data collected to determine at least one operational characteristic of the vehicle, where the analysis includes enabling the user to define a geofence.

Still another aspect of the concepts disclosed herein is a method for enabling a user to define specific parameters to be used to analyze such fuel use encoded data. In an exemplary embodiment, a user can define a geographical parameter, and analyze the fuel use encoded data in terms of the user defined geographical parameter. In a particularly preferred, but not limiting exemplary embodiment, the geographical parameter is a geofence, which can be generated by displaying a map to a user, and enabling the user to define a perimeter "fence" around any portion of the map. FIG. 6 is a high level logic diagram showing exemplary overall method steps implemented in accord with the concepts disclosed herein, and summarized above, to utilize fuel encoded position data collected to determine at least one operational characteristic of the vehicle, where the analysis includes enabling the user to define a geofence. It should be understood that the method of FIG. 6 is implemented on a computing system remote from the vehicle collecting the fuel use encoded position data. In at least one exemplary, but not limiting embodiment, the fuel use encoded position data is stored in a networked location, and accessed and manipulated by a user at a different location.

In a block 30, a map is displayed to a user. In a block 32, the user is enabled to define a geofence on the map (i.e., by prompting the user to define such a geofence, or simply waiting until the user provides such input). In general, a geofence is defined when a user draws a perimeter around a portion of the displayed map using some sort of computer enabled drawing tool. Many different software programs enable users to define and select portions of a displayed map, thus detailed techniques for defining a geofence need not be discussed herein. In a block 34, the user is enabled to define a specific vehicle and a time period to be analyzed (i.e., by prompting the user to define such parameters, or simply waiting until the user provides such input). In a block 36, fuel use encoded position data for the specified vehicle, location parameter (as defined by the geofence), and time parameter is retrieved. In a block 38, the user is enabled to define the operational characteristic of the vehicle to be determined. As noted above, exemplary operational characteristics include, but are not limited to, determining a quantity of fuel consumed off road (and thus not subject to road taxes) during the specified period, and monitoring fuel usage for a vehicle traversing the same route a number of times to identify changes in fuel usage not attributable to changes in load or traffic.

Figure 7:
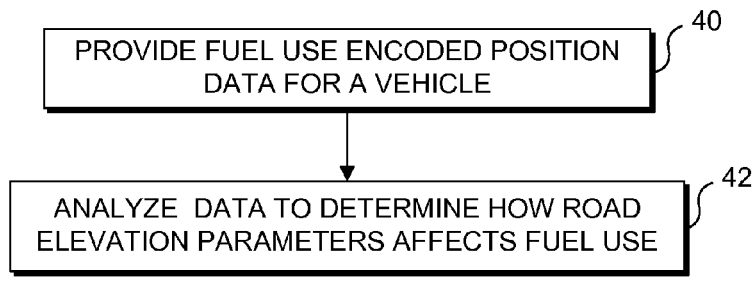
FIG. 7 is a flow chart showing exemplary method steps implemented to utilize fuel encoded position data collected by a vehicle to analyze fuel use patterns based on elevation changes.

Yet another use for the fuel use encoded position data is to provide a data set to be used to analyze fuel consumption relative to elevation change. Referring to FIG. 7, in a block 40 previously generated fuel use encoded position data for a specific vehicles is acquired. As discussed above, such data is collected during operation of the vehicle, and generally stored in a database or memory accessible in a networked environment (public or private). Accessing such data can, if desired, require entering a password or other type of credential to ensure that access to such data is restricted to authorized parties. In a block 42, the accessed data is analyzed to determine how road elevation affects fuel consumption. By quantifying how much fuel is consumed traveling over a route with elevation changes, one can identify alternate, possibly longer routes, that are more fuel efficient due to fewer elevation changes. This analysis may include comparing data collected while traveling different routes connecting the same starting point and destination, where the different routes involve different elevation changes. This analysis may also involve comparing actual data with estimated fuel use over a hypothetical alternate route, to aid in determining if the alternate route (for example, a route that includes fewer elevation changes) is more fuel efficient.

Figure 8:
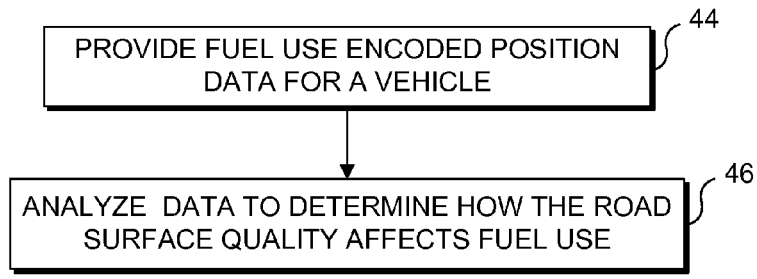
FIG. 8 is a flow chart showing exemplary method steps implemented to utilize fuel encoded position data collected by a vehicle to analyze fuel use patterns based on different types of road surfaces.

A related use for the fuel use encoded position data is to provide a data set to be used to analyze fuel consumption relative to road surface. Referring to FIG. 8, in a block 44, previously generated fuel use encoded position data for a specific vehicle is acquired. In a block 46, the accessed data is analyzed to determine how road surface parameters affect fuel consumption. Analyzing fuel consumption relative to the type of road surface will enable vehicle operators to learn what type of road surfaces are associated with lower fuel consumption. Regularly traveled routes can then be analyzed to determine if an alternate route over a different type of road surface could lead to lower fuel consumption. This analysis may include comparing data collected while traveling different routes connecting the same starting point and destination, where the different routes involve different types of road surfaces. For example, data collected while the vehicle travels a first relatively longer route over a road that has been repaved relatively recently can be compared with data collected while the vehicle travels over a second relatively shorter route over a road that has been not been repaved recently, to determine whether the relatively longer route is more fuel efficient due to the differences in the road surfaces. Other differences in types of road surfaces include grooved surfaces verses ungrooved surfaces, paved surfaces verses unpaved surfaces, and asphalt surfaces verses concrete surfaces. Specifics regarding road types (paved, unpaved, grooved, un-grooved, asphalt, concrete, etc.) can be added to the fuel use encoded position data to help in identifying trends that correlate surface type to fuel use.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A method for automatically detecting the existence of a mechanical problem in a vehicle equipped with a geographical position system, the method comprising the steps of:
   (a) collecting geographical position data from the vehicle during vehicle operation, the geographical position data being time indexed;
   (b) collecting fuel injector data from the vehicle during operation of the vehicle, the fuel injector data being time indexed to define a quantity of fuel passing through an engine fuel injector at a specific point in time;
   (c) combining the fuel injector data and the geographical position data together at the vehicle to produce fuel use encoded position data for a first instance of operating the vehicle on a route;
   (d) combining the fuel injector data and the geographical position data together at the vehicle to produce fuel use encoded position data for a second instance of operating the vehicle on the route;
   (e) conveying the fuel use encoded position data to a remote computing device that is physically spaced apart from the vehicle; and
   (f) causing the remote computing device to automatically compare fuel use during the second instance of operating the vehicle on the route to fuel use during the first instance of operating vehicle on the route and if fuel efficiency has decreased, to provide an indication for inspecting the vehicle for a mechanical problem.

2. The method of claim 1, further comprising the steps of:
   (a) collecting odometer data from the vehicle during operation of the vehicle; and
   (b) including the odometer data in the fuel use encoded position data such that the odometer data is also time indexed.

3. A method for generating and using fuel use encoded position data from a vehicle equipped with a geographical position system to determine at least one operational characteristic of the vehicle, the method comprising the steps of:
   (a) collecting geographical position data from the vehicle during vehicle operation;
   (b) collecting fuel injector data from the vehicle during operation of the vehicle, the fuel injector data defining a quantity of fuel passing through an engine fuel injector;
   (c) combining the fuel injector data and the geographical position data together at the vehicle to produce fuel use encoded position data, such that the fuel use encoded position data is time indexed;
   (d) conveying the fuel use encoded position data to a remote computing device; and
   (e) using said remote computing device to automatically analyze the fuel use encoded position data to determine at least one aspect of the vehicle condition.

4. the method of claim 3, further comprising the steps of:
   (a) collecting odometer data from the vehicle during operation of the vehicle; and
   (b) including the odometer data in the fuel use encoded position data, before conveying the fuel use encoded position data to the remote computing device.

5. The method of claim 3, wherein the step of analyzing the fuel use encoded position data to determine at least one aspect of the vehicle condition comprises the step of comparing the vehicle's fuel usage for a first trip with the vehicle's fuel use for a second trip, where the geographical position data collected during the first and second trip indicate the vehicle traversed the same route for the first and second trips, such that a change in the fuel usage indicates a change in fuel consumption required to traverse the same route.

6. The method of claim 3, wherein the step of analyzing the fuel use encoded position data to determine at least one aspect of the vehicle condition comprises the step of enabling a user to define a geofence, such that only fuel use encoded position data falling within the confines of the geofence are included within the analysis.

7. A system for analyzing fuel use encoded position data from a vehicle equipped with a geographical position system and a fuel injector sensor indicating a quantity of fuel passing through a fuel injector in the vehicle, to determine at least one operating characteristic of the vehicle, the system comprising:
  (a) a geographical position system for use in the vehicle, the geographical position system including:
    (i) a positioning sensing component for collecting geographical position data from the vehicle during vehicle operation, the geographical position data being time indexed;
    (ii) a first data port for receiving fuel injector data from the vehicle during operation of the vehicle, the fuel injector data being time indexed to define a quantity of fuel passing through an engine fuel injector at a specific point in time;
    (iii) a processor for combining the fuel injector data and the geographical position data together to produce fuel use encoded position data; and
    (iv) a data link for conveying the fuel use encoded position data to an external computing device; and
  (b) a remote computing device spaced apart from the vehicle and configured to receive the fuel use encoded position data via the data link, the remote computing device including a non-transitory memory for storing machine instructions and a processor, the said machine instructions, when implemented by a processor, enabling a user to access the fuel use encoded position data for the vehicle, and analyzing the fuel use encoded position data to determine at least one aspect of the vehicle condition.

8. The system of claim 7, wherein the remote computing device is configured to monitor changes in the vehicle's use of fuel, by implementing the steps of:
  (a) enabling a user to define a route traversed by the vehicle; and
  (b) automatically generating a fuel usage report for the vehicle, the fuel usage report identifying how much fuel the vehicle used traversing the route, such that changes in fuel use while traversing the same route can be identified.

9. The system of claim 7, wherein the remote computing device is configured to enable the user to define geographical positions corresponding to off road use of the vehicle, or enable the user to define the route traversed by the vehicle, by enabling the user to define a geofence.

10. The system of claim 7, wherein the geographical position system for use in the vehicle further includes a second data port for receiving odometer data from the vehicle during operation of the vehicle, and wherein the processor is configured to include the odometer data in the fuel use encoded position data such that the odometer data is also time indexed.

11. A method for using fuel use encoded position data from a vehicle equipped with a geographical position system to determine at least one aspect of the vehicle condition, the method comprising the steps of:
  (a) providing, to a remote computer, time indexed fuel use encoded position data collected during operation of the vehicle, the fuel use encoded position data including fuel injector data defining a quantity of fuel passing through an engine fuel injector during operation of the vehicle and geographical position data defining a relative location of the vehicle during operation of the vehicle; and
  (b) using the remote computer to automatically analyze the fuel use encoded position data to determine at least one aspect of the vehicle condition.

12. The method of claim 11, wherein the step of automatically analyzing the fuel use encoded position data comprises the step of automatically analyzing how elevation changes during operation of the vehicle affects fuel usage.

13. The method of claim 11, wherein the step of automatically analyzing the fuel use encoded position data comprises the step of automatically analyzing how a type of road surface encountered during operation of the vehicle affects fuel usage.

14. The method of claim 11, wherein the step of automatically analyzing the fuel use encoded position data comprises the step of automatically generating an idle time fuel usage report for the vehicle, the idle time fuel usage report identifying how much fuel the vehicle used while remaining in a static position during the specified time period.

* * * * *